United States Patent [19]

Bartoszek-Loza et al.

[11] Patent Number: 5,169,675
[45] Date of Patent: Dec. 8, 1992

[54] BONDING OF HIGH NITRILE RESINS ONTO SURFACE PLASMA TREATED PLASTICS

[75] Inventors: Rosemary Bartoszek-Loza, Solon; George W. Prohaska, Willoughby; Joseph McCaul, Mentor, all of Ohio

[73] Assignee: The Standard Oil Company, Cleveland, Ohio

[21] Appl. No.: 301,801

[22] Filed: Jan. 25, 1989

Related U.S. Application Data

[63] Continuation-in-part of Ser. No. 69,082, Jul. 2, 1987, abandoned.

[51] Int. Cl.$^5$ ............................................. B05D 3/06
[52] U.S. Cl. ..................................... 427/520; 427/536; 427/521; 427/539; 427/517
[58] Field of Search ........................ 427/38, 39, 40, 41, 427/53.1, 54.1, 55

[56] References Cited

U.S. PATENT DOCUMENTS

| | | | |
|---|---|---|---|
| 3,426,102 | 2/1969 | Solak et al. | 260/879 |
| 3,586,737 | 6/1971 | Duke et al. | 260/879 |
| 3,763,278 | 10/1973 | Griffith | 260/880 R |
| 4,466,993 | 8/1984 | Hsu et al. | 427/44 |
| 4,468,412 | 8/1984 | Fujii et al. | 427/38 |
| 4,510,204 | 4/1985 | Duke et al. | 427/388.4 |
| 4,557,975 | 12/1985 | Moore | 428/412 |
| 4,683,169 | 7/1987 | Curry et al. | 428/337 |
| 4,725,454 | 2/1988 | Galli et al. | 427/41 |

Primary Examiner—Marianne Padgett
Attorney, Agent, or Firm—Larry W. Evans; John E. Miller; Teresan W. Gilbert

[57] ABSTRACT

A process for adhering high nitrile resins onto a plastic material. The process comprises the steps of selecting a high nitrile resin having a nitrile content of at least about 60 percent by weight and prepared by the copolymerization of an olefinically unsaturated monovinyl nitrile and a monovinyl monomer copolymerizable therewith in the presence of a conjugated diene rubber, preparing a solution comprising from about one to 70 percent by weight of the high nitrile resin in a photopolymerizable solvent comprising from about 30 to 99 percent by weight of the solution and from about 0.1 to 10 percent by weight of a photoinitiator with an attendant decrease in one or both of the high nitrile resin and the photopolymerizable solvent to provide 100 percent by weight of the solution, subjecting the surface of the plastic material to a reactive gas plasma, said reactive gases being selected from the group consisting of water, oxygen, hydrogen and combinations thereof to modify the surface, applying the solution onto the modified plastic surface and, curing the high nitrile resin and photopolymerizable solvent by irradiation to form a tack free protective coating highly adherent to the plastic surface.

14 Claims, No Drawings

BONDING OF HIGH NITRILE RESINS ONTO SURFACE PLASMA TREATED PLASTICS

CROSS-REFERENCE TO RELATED APPLICATION

This application is a continuation-in-part of U.S. Ser. No. 069,082, filed Jul. 2, 1987, now abandoned.

TECHNICAL FIELD

The present invention is directed generally to the adhesive bonding of high nitrile resin coatings onto plastic surfaces that have been treated by a reactive gas plasma.

There is a need to improve the resistance of plastics to moisture, oxygen and chemical resistance. It has been discovered that coating nitrile films onto plastic surfaces can overcome deficiencies of lack of chemical resistance, poor barrier properties and abrasion resistance of plastics used in engineering.

BACKGROUND OF THE INVENTION

Commercial processes have employed ultraviolet cure processing for plastic substrates. Further, an ultraviolet cure followed by a thermal cure has been employed to coat polycarbonates. U.S. Pat. No. 4,557,975, for instance, describes a photocure method for coating acrylate-acrylonitrile onto plastic articles.

There exists a need to improve the adhesion of high nitrile coatings onto plastic substrates, so that the plastic material has improved protection to the environment.

Adhesion of coatings onto plastic material have been accomplished by several of the following processes: thermal cures, photocurable cures, lamination, and adhesives. U.S. Pat. No. 3,853,657 discloses the bonding of polyethylene terephthalate fibers induced by low-temperature plasmas. U.S. Pat. No. 4,468,412 is directed toward a process for applying a light curable or radiation curable resin composition onto a polyolefin molding composition which includes the steps of pretreating the surface of the molding composition.

Notwithstanding the processes taught by these patents, there exists a need to improve the adhesive bonding characteristics of high nitrile resins to plastics.

DISCLOSURE OF THE INVENTION

It is, therefore, an object of the present invention to provide a process for adhering high nitrile resins onto a plastic substrate.

It is another object of the present invention to provide a process employing a reactive gas plasma to modify the surface of plastic substrates which allows for strong adhesive bonding of high nitrile resin coatings onto the substrate.

It is another object of the present invention to provide photocured high nitrile resin coatings which impart solvent protection to the plastic substrate.

As further objects, the process of the present invention allows for simplicity of approach, freedom of distortion of the plastic substrate from high temperatures, excellent solvent resistance and excellent adhesion.

In general the present invention provides a process for adhering high nitrile resins onto a plastic material comprising the steps of selecting a high nitrile resin having a nitrile content of at least about 60 percent by weight and prepared by the copolymerization of an olefinically unsaturated monovinyl nitrile and a monovinyl monomer copolymerizable therewith in the presence of a conjugated diene rubber, preparing a solution comprising from about one to 70 percent by weight of the high nitrile resin in a photopolymerizable solvent comprising from about 30 to 99 percent by weight of the solution and from about 0.1 to 10 percent by weight of a photoinitiator with an attendant decrease in one or both of the high nitrile resin and the photopolymerizable solvent to provide 100 percent by weight of the solution, subjecting the surface of the plastic material to a reactive gas plasma, said reactive gases being selected from the group consisting of water, oxygen, hydrogen, and combinations thereof to modify the surface, applying the solution onto the modified plastic surface and, curing the high nitrile resin and photopolymerizable solvent by irradiation to form a tack free protective coating highly adherent to the plastic surface.

These and other objects, together with the advantages over known processes shall become apparent from the specification that follows and are accomplished by the invention as hereinafter described and claimed.

PREFERRED EMBODIMENT FOR CARRYING OUT THE INVENTION

According to the present invention, it has been discovered that adhesive bonding of a high nitrile coating onto plastic surfaces can be obtained through the use of a process employing a plasma surface modification of the plastic.

As noted hereinabove, the invention relates to a process for adhering high nitrile resin films and coatings onto a plastic material such as film or sheet material. The surface of the plastic material is modified by subjecting the surface of a reactive vapor plasma which causes modification of the surface. A high nitrile resin coating composition is applied to the surface modified plastic and then the coating composition is cured by irradiation to a desired level of tackiness and preferably to a tack free state.

Treatment of the plastic by a reactive gas vapor plasma prior to the application of the photocurable high nitrile resin coating composition results in modification of the surface of the plastic so as to provide a bondable plastic surface highly adherent to the high nitrile resin film coating composition.

The process of the present invention can be employed with all forms of plastics, such as sheets, molded items or films. One or both surfaces of the plastic can be treated by this process.

The plastics that can be employed include the polycarbonates, polybutadiene rubber, polyethylene, polypropylene, polytetrafluoroethylene, polyacrylonitrile, polyvinylchloride, polyvinylacetate, polymethylmethacrylate, polystyrene, cellophane, cellulose acetate co-monomer, polyamides, polybutylene and polyester and the derivatives of the above mentioned plastics. The preferred plastic employed in this invention is polycarbonate.

The polycarbonates as a class of compounds and their manufacture are well known and recognized by those experienced in the art. The polycarbonates heretofore mentioned are for the sake of example only and are not to be construed as limiting the scope of the invention.

Illustrative polycarbonates are unbranched or branched homopolymers and copolymers and mixtures thereof that are prepared by reacting a dihydric phenol with a carbonate precursor. Typical of some of the dihydric phenols that may be employed to make the substrates of this invention are 2,2-bis(4-hydroxyphenyl)propane, bis(4-hydroxyphenyl)methane, 2,2-bis(4-hydroxy-3-methylphenyl)propane, 3,3-bis(4-hydroxyphenyl)pentane, 2,2-bis(3,5-dichloro-4-hydroxyphenyl)propane, 2,2-bis(3,5-dibromo-4-hydroxyphenyl)propane, 2,2-bis(3-5-dibromo-4-hydroxyphenyl)propane, bis(3-chloro-4-hydroxyphenyl)propane, bis(3-chloro-4-hydroxyphenyl)methane and the like.

In addition to using a single dihydric phenol, it is possible to employ two or more different dihydric phenols or a copolymer of a dihydric phenol with a glycol or with a hydroxy or acid terminated polyester, or with a dibasic acid in the event a carbonate copolymer or interpolymer rather than a homopolymer is desired for use as a substrate. Also employed in the practice of this invention may be blends of any of the above materials to provide the polycarbonate substrate.

The carbonate precursor utilized to make typical polycarbonate substrates may be either a carbonyl halide, a carbonate ester or a haloformate. Specific carbonate precursors are well known in the art. Carbonyl chloride, also known as phosgene, is preferred.

Also included herein are the polymeric derivatives of a dihydric phenol, a dicarboxylic acid, carbonic acid and the like.

The surface modification of the plastic is effected by a reaction of the plastic with a reactive gas plasma. The reactive gas plasma can be employed using a single gas or a combination of gases. The reactive gas plasma can be generated from liquids, solids and/or gases. Typical reactive gases include but are not limited to water, hydrogen, oxygen, volatile non-polymerizing alcohols, non-polymerizing organic acids and the like. Most preferred are oxygen, water or combinations thereof. The reactive gas plasma does not include the use of nitrogen or acetonitrile to modify the surface of the polycarbonates or other plastic substrates.

The reactive gas process can be carried out in a plasma reactor. For illustration purposes, a suitable reactor for carrying out the reactive gas plasma modification process comprises a vacuum chamber in a containment vessel such as a stainless steel or glass bell jar. In the vacuum chamber are two electrodes which can be screen coil or plate material that has good electrical conductivity, such as stainless steel, platinum, graphite or the like.

One electrode, that is the anode, is grounded and the other electrode, that is the cathode, is connected to an external power supply which may be either DC or AC current, so that there exists a voltage potential, from about 0.5 volts to about 1000 volts, preferably about 10 volts to about 300 volts between the electrodes with an alternating current from about 150 kHz to about 2 GHz, preferably about 1 MHz to about 50 MHz. The interelectrode gap is from about ¼ inch (0.6 cm) to about 2 feed (61 cm) and preferably from about 1 inch (2.5 cm) to about 5 inches (12.5 cm).

The vacuum chamber has an inlet opening to allow the gas to enter, while an outlet on the vacuum chamber allows for the evacuation of the vacuum chamber by being connected to a mechanism such as a pump to remove the gas plasma.

In carrying out the surface modification treatment of the plastic substrate, the plastic sheet material is placed on the anode. The vacuum chamber in then evacuated to a pressure of about $10^{-3}$ torr to about $10^{-10}$ torr. The gas enters the inlet at a partial pressure of greater than about 1 millitorr up to about 10 torr. The gas becomes a vapor plasma by employing a voltage to cause an electrical breakdown of the gas state to a plasma state. A plasma of the reactive gas is initiated between the electrodes by energizing the power source from about 10 watts to about 10 kwatts. The discharge duration is generally from about 1 minute to about 2 minutes, depending on the power, pressure and desired extent of surface modification. After the reaction, the discharge is extinguished by turning off the power supply and the vacuum chamber is evacuated to a base vacuum of about $10^{-3}$ torr to about $10^{-10}$ torr. The vacuum chamber is brought up to atmospheric pressure by bleeding in a cleansing gas such as nitrogen gas into an inlet. The treated plastic substrate can be stored with or without a protective covering such as aluminum foil and placing them on a shelf or in a controlled atmosphere such as a dry box.

The surface treated plastic is then coated with a photocurable high nitrile resin coating composition. The photocurable coating composition of the instant invention are the reaction products of high nitrile resins, photopolymerizable solvents and photoinitiators. The coating compositions of the present invention contains high nitrile resins in at least from about one percent to about 70 percent of the total weight. More preferably, the coating compositions contain high nitrile resins in from about 20 percent to about 55 percent, and most preferably from about 30 percent to 50 percent of the total weight.

In the practice of this invention any of the high nitrile resins can be employed either alone or in combination. High nitrile resins used in this invention comprise at least about 60 percent to about 90 percent by weight nitrile monomer, from about 10 to about 40 percent by weight monovinyl monomer, and from about one to about 30 percent by weight rubber component, totalling 100 percent by weight. While the monomeric components have been recited, the process of the present invention employs rubber modified copolymer resins, not monomers, in the coating composition.

More particularly, the olefinically unsaturated nitriles that can be employed in the present invention include the alpha, beta-olefinically unsaturated mononitriles having the structure:

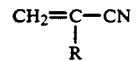

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers, and others.

The esters of olefinically unsaturated carboxylic acids include those having the structure:

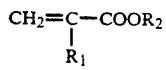

wherein $R_1$ is hydrogen, an alkyl group having from 1 to 6 carbon atoms, or a halogen, and $R_2$ is an alkyl group having from 1 to 30 carbon atoms. Compounds of this type include methyl acrylate, ethyl acrylate, the propylacrylates, the butyl acrylates, and amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure

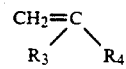

wherein $R_3$ and $R_4$ are alkyl group having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate. The vinyl aromatic monomers include styrene, alpha-methyl styrene, the vinyl toluenes, the vinyl xylenes, indene and the like. Most preferred is styrene.

The olefinic nitrile copolymer is optionally polymerized in the presence of a preformed diene rubber which may be a homopolymer or copolymer of a conjugated diene monomer. These monomers include 1,3-butadiene, isoprene, chloroprene, bromoprene, cyanoprene, 2,3-dimethyl 1,3-butadiene, 2-ethyl 1,3-butadiene, 2,3-diethyl 1,3-butadiene and the like. Most preferred for the purpose of this invention are 1,3-butadiene and isoprene because of their ready availability and their excellent polymerization properties.

The conjugated diene monomer may be copolymerized with a comonomer selected from the group consisting of vinyl aromatic monomer, an olefinic nitrile monomer having the structure:

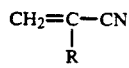

wherein R has the foregoing designation, and an ester having the structure:

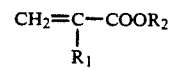

wherein $R_1$ and $R_2$ have the foregoing designations. The rubbery polymer contains from 50 percent to 100 percent by weight of polymerized conjugated diene monomer and from 0 percent to 50 percent by weight of a comonomer.

Preferred polymers useful in this invention are those prepared by the polymerization of 100 parts by weight of (A) from 60 percent to 90 percent by weight of at least one nitrile having the structure:

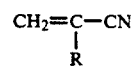

wherein R has the foregoing designation and (B) from 10 percent to 40 percent by weight based on the combined weights of (A) and (B) of at least one member selected from the group consisting of an ester having the structure:

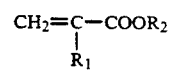

wherein $R_1$ and $R_2$ have the foregoing respective designations; and alpha-olefins having the structure:

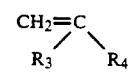

wherein $R_3$ and $R_4$ have the foregoing respective designations; a vinyl ether selected from the group consisting of methyl vinyl ether, ethyl vinyl ethers, the propyl vinyl ethers, and the butyl vinyl ethers; vinyl acetate; styrene and indene, in the presence of from one to 40 parts by weight of (C) a rubbery polymer of a conjugated diene monomer selected from the group consisting of butadiene and isoprene and optionally a comonomer selected from the group consisting of styrene, a nitrile monomer having the structure:

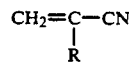

wherein R has the foregoing designation, and an ester having the structure:

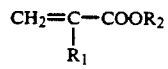

wherein $R_1$ and $R_2$ have the foregoing respective designations, said rubbery polymer containing from 50 percent to 100 percent by weight of polymerized conjugated diene from about 0 percent to 50 percent by weight of a comonomer.

The most preferred nitrile polymers are prepared by the polymerization of between 70 and 80 parts by weight of (A) and 20 to 30 parts by weight of (B) in the presence of from 5 to 15 parts by weight of (C). One particularly suitable nitrile polymer that can be employed as the gas barrier film in Barex 210, a trade name for the commercial product of BP America, Inc., a subsidiary of British Petroleum Company, which is a poly(acrylonitrile-methyl acrylate-butadiene) composition (70:21:9) having a number average molecular weight of 50,000.

Thermoplastic high nitrile resins of at least 70 percent by weight of a monosaturated nitrile and up to 30 percent by weight of at least one other comonomer and which may also be rubber modified have previously been described in U.S. Pat. Nos. 3,426,102, 3,586,737, 3,763,278, the subject matter of which is incorporated herein by reference.

Most preferred high nitrile resins are those prepared by the polymerization of more than about 70 parts by weight of a monosaturated nitrile and less than about 30 parts by weight of a monovinyl monomer component copolymerizable with said nitrile in the presence of a preformed rubber of a conjugated diene.

The second component of the coating compositions of the present invention is a photopolymerizable solvent. The solvents include any solvents which are compatible with the high nitrile resin components and ar generally well known in the art. During photocure, polymerization is triggered photochemically by exposure to irradiation. The coating compositions are classified as 100 percent solids because the photopolymerizable solvent crosslinks and is incorporated into the coating. Minor amounts of other solvents may optionally be used which may be volatile, which does not defeat the object of this invention, to provide a substantially 100 percent solid coating composition.

These photopolymerizable solvents can be employed either alone or in combination. The coating compositions generally contain, in percent of the total wight, from about 30 percent by about 99 percent, preferably from about 40 percent to about 80 percent and most preferably from about 50 percent to about 75 percent of the photopolymerizable solvent.

Types of suitable photopolymerizable solvents include acrylates, olefinically unsaturated carboxylic acids and their anhydrides, vinyl esters, vinyl halides, vinyl cyanides, vinyl amides, vinyl amines, olefins and other.

Acrylates useful as the photopolymerizable solvent include but are not limited to mono or di-(meth)acrylates or their esters and can be substituted with groups such as alkyl, cycloalkyl, glycidyltetrahydrofurfuryl, ally, hydroxyalkyl, and further include alkene glycol acrylates, polyoxyalkylene glycol acrylate, trimethyl propane acrylate, pentaerythritol acrylate and cyanoethyacrylate. Most preferred are alkyl acrylate, cycloalkyl acrylate, glycidyltetrahydrofurfuryl acrylate and cyanoethylacrylate.

The alpha, beta olefinically unsaturated carboxylic acid and their anhydrides useful as the photopolymerizable solvent include but are not limited to acrylic acid, methacrylic acid; alpha-chloro, bromo or cyanoacrylic acid; maleic acid; maleic anhydride; alpha-chloro maleic acid; dichloromaleic anhydride; itaconic acid and scorbic acid. Most preferred are acrylic acid and methacrylic acid.

The vinyl esters useful as the photopolymerizable solvent include but are not limited to methylvinyl ether, ethylvinyl ether, propylvinyl ether, butylvinyl ether, amylvinyl ether, hexylvinyl ether, cyclohexylvinyl ether, phenylvinyl ether, heptylvinyl ether and octylvinyl ether. Most preferred are methylvinyl ether and ethylvinyl ether.

The vinyl halides useful as the photopolymerizable solvent include but are not limited to vinyl chloride, vinylbromide, vinylfluoride, vinylidene chloride, vinylidene bromide, vinylidene fluoride, dichloro-difluoroethylene, chlorotrifluoroethylene, trifluoroethylene and chloroprene. Most preferred are vinyl chloride and vinylidene chloride.

The vinyl cyanides useful as the photopolymerizable solvent include but are not limited to acrylonitrile methacrylonitrile, maleic dinitrile fumaronitrile and vinylidene cyanide. Most preferred are acrylonitrile and methacrylonitrile.

The vinylamides useful as the photopolymerizable solvent include but are not limited to acrylamide, N-methacrylamide, N,N-dimethylacrylamide, N,N dimethylmethacrylamide, N-t-butylacrylamide, N-dodecyl acrylamide, N-phenyl acrylamide, N-vinyl acrylamide, N-N-methylenebisacrylamide, dimethylformamide and diethylformamide. Most preferred are N,N dimethylmethacryamide, N,N-methylenebisacrylamide and N,N dimethylacrylamide.

The vinyl amines useful as the photopolymerizable solvent include but are not limited to N-vinyl piperidine and vinyl pyridine.

The olefins useful as the photopolymerizable solvent include but are not limited to ethylene, propylene, butylenes, amylenes, hexylenes, heptenes, octylenes, 1,3-butadine, isoprene, styrene, alpha-methylstyrene, and alpha-chlorostyrene. Most preferred are styrene and alpha-methylstyrene.

Other exemplary typical photopolymerizable solvents are N-vinyl pyrrolidine, N-methyl pyrrolidone, ethylene carbonate, gamma-butyrolactone, and dimethylsulfone. The most preferred are N-vinyl pyrrolidone and gamma butyrolactone.

The third component of the coating composition of the present invention is the photoinitiator. During cure the photoinitiators absorb actinic radiation, forming reactive free radical intermediates that react further with the photopolymerizable solvent and resin. A general discussion of chemical reaction initiators is available in Kirk-Othmer, Encyclopedia of Chemical Technology, Vol. 13, pp. 355-373, "Initiators", John Wiley and Sons, 1978. These photoinitiators can be employed either alone or in combination in an amount sufficient to effect the photocure of the coating composition upon irradiation. The coating composition generally contains, in percent of the total weight, from about 0.1 percent to about 10 percent by weight, preferably from about 0.1 -percent to about 5 percent by weight, and most preferably from about 0.5 percent to about 2 percent by weight, of the photoinitiator.

The photoinitiator additives are generally well known in the art. Examples of suitable photoinitiators include acetophenone derivatives, azo compounds, benzoin derivatives, amines, anthraquinone derivatives, dibenzyl ketones, benzophenone derivatives, benzoin alkyl ethers and the like. Particular non-limiting examples of the photoinitiators include benzophenone, benzil, benzoin ethyl ether and azobisisobutyronitrile. Most preferred is benzophenone and ethyl diethanolamine or similar amines.

It will be readily apparent to those skilled in the art that the coating composition may be further modified by the addition of the plasticizers, stabilizers, pigments, dispersants, defoamers, surfactants, extenders, fillers, reinforcing agents and other film formers. The coating compositions of the instant invention may also optionally contain various flattening agents, surface active agents, thixotropic agents, UV light absorbers, flow control agents, viscosity agents, antioxidant agents and dyes. All these additives and the use thereof are well known in the art and do not require extensive discussion, it being understood that any compound possessing the ability to function in such a manner, i.e., as a flattening agent, surface active agent, UV light absorber and the like, can be used so long as it does not delteriously affect the photocuring of the coating composition and does not adversely affect the characteristics of the coating.

The photocurable coating compositions are first compounded by adding together the photopolymerizable solvents to form a homogeneous mixture, to which is then added the high nitrile resin, forming a mixture. To this mixture is added the photoinitiators, preferably in the dark, with stirring. Optionally, at any step prior to the photocure in the process, any of the aforementioned additives may be stirred into the mixture. The various components are thoroughly mixed so as to form a generally homogeneous coating composition.

A thin, relatively uniform film of coating composition is applied onto the modified plastic substrate by any of the known means such as Guardco TM wet film applicator rods, knife, bar, airless spraying, dipping, roller coating, flowing, brushing, conventional and/or electrostatic spray gun, electrodeposition and the like. Generally, the coating composition is applied in an amount sufficient to provide a dry cured coating thickness of from about 0.05 mil to about 5 mil, preferably from about 0.1 mil to about 3 mil. Optionally, multiple coats of the composition may be applied to the substrate.

The coating composition is then cured at ambient temperature by irradiation to the desired level of tackiness and preferably to a tack free coating. The light source preferably emits wavelengths in the spectrum from about 2,200Å to about 14,00Å. Optionally, the light source includes light having a substantial ultraviolet spectrum from about 2,200Å to about 4,000Å. The system used to generate ultraviolet radiation for the photopolymerization reaction can be any known in the art such as low pressure, medium pressure, high pressure, super high pressure, mercury lamps, mercury, carbon and plasma arc lamps; xenon lamps; UV light emitting diodes, UV emitting lasers and the like. The photopolymerizable coating compositions can also be cured using an electron beam apparatus.

Specific Embodiments

The following examples further illustrate the present invention. These embodiments are presented by way of example and not by way of limitation of the scope of this invention. Further, it is understood that variations and modifications can be made by one skilled in the art without departing from the spirit and scope of the invention.

Plasma Reactor

The plasma reactor utilized to modify the plastic surfaces employed a parallel-plate diode configuration. The plasma reactor system is essentially a containment chamber containing a vacuum chamber and electrodes attached to a power supply for initiating a plasma state of the reactive gas.

Two electrodes were placed in the stainless steel bell jar reactor, one was a lower grounded anode made of stainless steel and about six inches (15 cm) in diameters and the other was an upper cathode made of stainless steel, about five inches (12.5 cm) in diameter connected to about 13.56 MHz external power supply. The inter-electrode gap was about one inch (2.5 cm).

The stainless steel bell jar reactor, having a volume of about 54 liters, was connected by molecular sieve traps to a mechanical pump and had a base vacuum about $10^{-4}$ torr. A vial, attached to the inlet of stainless steel bell jar reactor, held the starting material which evaporated into the reactor as a vapor feed gas. A flow controller attached to the vial controlled the delivery rate of feed gas into a plasma. The reaction pressure was established and maintained by an automatic throttle plate located between the reactor and the pump.

Plasma Reaction Procedure

Each plastic sheet sample was placed on the anode in the plasma diode configuration and then the reaction chamber was evacuated to a base vacuum of about $10^{-4}$ torr. The plasma conditions for Examples 1–12 and 17–22 were a pressure of about 130 mtorr to about 140 mtorr, a vapor flow rate of about 45 SCCM, and a power level of about 180 watts to about 190 watts. The plasma condition for Examples 13–16 and 23–30 were a pressure of about 130 mtorr to about 140 mtorr, a vapor flow rate of about 45 SCCM and a power level of about 100 watts.

A plasma was ignited by turning on the cathode power and the power level was adjusted to the desired level. The discharge duration was for about five minutes for Examples 7–16, and 23–26 and about 10 minutes for Examples 1–6, 17–22 and 17–30. The discharge was then extinguished and the reactor was evacuated to a base vacuum of about $10^{-4}$ torr. The reactor was brought up to atmospheric pressure with nitrogen gas and the treated samples were removed and stored at room temperature.

Plastic Sample

A polycarbonate sample packaged in clear protective film on one face and blue or green protective film on the other face was employed. Either the clear or blue film was removed and then that side of the polycarbonate was placed on the lower electrode and treated. Examples 1–3, 10–15, 20–24, 27 and 28 had the clear face treated and Example 4–9, 16–19, 25, 26, 29 and 30 had the blue face treated.

Coating Composition

The coating composition was prepared by mixing together about 40 g of Barex 210° resin, about 60 g of gamm-butyrolactone, about 1 g benzophenone, about 1 g ethyldiethanolamine and about 1 g Irgacure ® until a homogeneous mixture resulted. Irgacure is a registered trademark of Ciba-Geigy Corporation for a series of free radical initiators including benzophenone and arylalkyl ketones. The actual photoinitiator added to the Barex 210 ® coating composition was Irgacure 651 which is 2,2-dimethoxy-2-phenylacetophenone.

Test Process

The high nitrile coating composition was applied to plasma treated surfaces of polycarbonate using a Cuardo TM drawbar.

The coating was radiation curd to a tack free coating by using a Salisbury Engineering model UVCC-5M conveyor system with a lamp setting of 200 w/in and the following parameters for Examples 1, 4, 7, 10, 17 and 20 and comparative Examples A and B a speed setting of 10 with 5 passes, for Examples 2, 5, 8, 11, 13, 15, 18, 21, 23, 25, 27 and 29, a speed setting of 10 with 10 passes and for Examples 3, 6, 9, 12, 14, 16, 19, 22, 24, 26, 28, 30 and comparative Examples C and D a speed setting of 20 with 10 passes.

Adhesion Test

Adhesion Test A

A sharp tool was employed to scribe the coating substrate of all coated plastic samples. A tool was then used to attempt to lift the nitrile film off of the coated plastic substrate sample. If the nitrile film was removed, the rating of rail was given and if the nitrile film was not removed a pass rating was given.

Adhesion Test B

The adhesion tape test (ASTMD-3359) was also carried out by cutting a square grid, approximately five inches (12.5 cm) per side with a metal cutting wheel into the center area of the coating on the plastic substrate. Adhesive tape was then applied to the grid and used to lift of the grid. The results of the adhesion test are shown in Table I. Adhesion was assessed according to the percent of coating remaining on the plastic substrate following the tap peel, with no adhesion being 0% and 100% adhesion being no loss of coating. The results of the adhesion tape test are shown in Table I.

The instant invention demonstrates the excellent adherence of high nitrile resin coating compositions onto polycarbonate plasma modified substrates. The polycarbonate substrate samples treated with oxygen and/or water vapor plasma prior to coating the polycarbonate results in excellent adhesion and the majority of samples gave 100% adhesion. The degree of adhesion was further dependent upon the plasma conditions of pressure, power, flow rate and treatment time. In contrast, comparative Examples A-D which had no plasma treatment of the polycarbonate prior to coating with a high nitrile resin resulted in 0% adhesion.

TABLE I

Polycarbonate Sheets Coated with High Nitrile Composition

| Example | Plasma Gas | Adhesion Test A | Adhesion Test B |
|---|---|---|---|
| 1 | H$_2$O | Pass | 70 |
| 2 | H$_2$O | Pass | 70 |
| 3 | H$_2$O | Pass | 100 |
| 4 | H$_2$O | Pass | 100 |
| 5 | H$_2$O | Pass | 100 |
| 6 | H$_2$O | Pass | 100 |
| 7 | H$_2$O | Pass | 100 |
| 8 | H$_2$O | Pass | 100 |
| 9 | H$_2$O | Pass | 100 |
| 10 | H$_2$O | Pass | 100 |
| 11 | H$_2$O | Pass | 80 |
| 12 | H$_2$O | Pass | 95 |
| 13 | H$_2$O | Pass | 100 |
| 14 | H$_2$O | Pass | 100 |
| 15 | H$_2$O | Pass | 100 |
| 16 | H$_2$O | Pass | 100 |
| 17 | Oxygen | Pass | 100 |
| 18 | Oxygen | Pass | 100 |
| 19 | Oxygen | Pass | 100 |
| 20 | Oxygen | Pass | 100 |
| 21 | Oxygen | Pass | 100 |
| 22 | Oxygen | Pass | 90 |
| 23 | Oxygen | Pass | 0 |

TABLE I-continued

Polycarbonate Sheets Coated with High Nitrile Composition

| Example | Plasma Gas | Adhesion Test A | Adhesion Test B |
|---|---|---|---|
| 24 | Oxygen | Pass | 0 |
| 25 | Oxygen | Pass | 50 |
| 26 | Oxygen | Pass | 50 |
| 27 | Oxygen | Pass | 90 |
| 28 | Oxygen | Pass | 50 |
| 29 | Oxygen | Pass | 100 |
| 30 | Oxygen | Pass | 0 |
| A | None | Pass | 0 |
| B | None | Fail | 0 |
| C | None | Pass | 0 |
| D | None | Pass | 0 |

In view of the test results, it should not be evident that the foregoing process fulfills the objects of the present invention. As noted hereinabove, the high nitrile film or coating on the plastic imparts solvent protection and chemical and environmental resistance to protect the plastic material. Furthermore, the radiation cure occurs at ambient temperature prevent heat distortion or destruction of the plastic substrate. The high nitrile film or coating on plastics can be use for packaging material, the automotive industry and wherever plastic materials are replacing metals and/or glass.

It is to be understood that the use of photocurable coating compositions is not limited to those exemplified herein which have been provided merely to demonstrate practice of the subject invention. Similarly, practice of the present invention should not be limited to polycarbonate substrates or the specific high nitrile resin exemplified herein or the polypolymerizable solvent and photoinitiator exemplified herein. Those skilled in the art may readily selected other solvents, photoinitiators and high nitrile resins according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A process for adhering high nitrile resins onto a plastic material comprising the steps of:
   selecting a high nitrile resin prepared by the copolymerization of an olefinically unsaturated monovinyl nitrile and a monovinyl monomer copolymerizable therewith in the presence of a conjugated diene rubber, said resin having a nitrile content of at least about 60 percent by weight;
   preparing a solution comprising from about one to 70 percent by weight of said high nitrile resin in a photopolymerizable solvent comprising from about 30 to 99 percent by weight of said solution and from about 0.1 to 10 percent by weight of a photoinitiator with an attendant decrease in one or both of said high nitrile resin and said photopolymerizable solvent to provide 100 percent by weight of said solution;
   subjecting the surface of said plastic material to a reactive gas plasma, said reactive gases being selected from the group consisting of water, oxygen, hydrogen and combinations thereof to modify said surface;
   applying said solution onto said modified plastic surface; and curing said high nitrile resin and photopolymerizable solvent by irradiation to form a tack free protective coating highly adherent to said plastic surface;

wherein said step of subjecting the surface of said plastic material to a reactive gas plasma is conducted in a containment vessel providing a vacuum chamber having an anode and a cathode and includes the steps of contacting said anode with said plastic;

initiating said reactive gas plasma step by evacuating said vacuum chamber to a pressure of from about $10^{-3}$ torr to about $10^{-10}$ torr and applying a voltage of from about 0.5 volts to about 1000 volts with an alternating current of from about 150 kHz to about 2 GHz such that the net power generated is from about 10 watts to about 10 kilowatts between said cathode and said anode; and treating said plastic surface for a period of from about one minute to about 60 minutes.

2. A process, as set forth in claim 1, wherein said plastic material is selected from the group consisting of polycarbonate, polybutadiene rubber, polyethylene, polypropylene, polytetrafluoroethylene, polyacrylonitrile, polyvinylchloride, polyvinylacetate, polymethylmethacrylate, polystyrene, cellophane, cellulose acetate comonomer, polyamides, polybutylene, polyester and combinations thereof.

3. A process, as set forth in claim 1, wherein said plastic material is polycarbonate.

4. A process, as set forth in claim 1, wherein said reactive gas plasma is selected from the group consisting of water, oxygen and combinations thereof.

5. A process, as set forth in claim 1, wherein said reactive gas plasma is water.

6. A process, as set forth in claim 1, wherein said reactive gas plasma is oxygen.

7. A process, as set forth in claim 1, wherein said treatment time is from about one minute to about 20 minutes.

8. A process, as set forth in claim 1, wherein said voltage is from about 10 volts to about 300 volts.

9. A process, as set forth in claim 1, wherein said alternating current is from about 1 MgHz to about 50 MgHz.

10. A process, as set forth in claim 1, wherein the interelectrode gap is from about one quarter inch (0.6 cm) to about two feet (61 cm).

11. A process, as set forth in claim 1, wherein said solution comprises the reaction products of a high nitrile resin, photopolymerizable solvent and photoinitiators.

12. A process, as set forth in claim 1, wherein said high nitrile resin and photolpolymerizable solvent is radiation cured at ambient temperature to produce a tack free coating.

13. A process, as set forth in claim 1, wherein said irradiation comprises wavelengths of from about 2,200Å to about 14,000Å.

14. A process, as set forth in claim 1, wherein said irradiation comprises wavelengths of from about 2,200Å to about 4,000Å.

* * * * *